US007197766B1

(12) United States Patent
Ræstad et al.

(10) Patent No.: US 7,197,766 B1
(45) Date of Patent: Mar. 27, 2007

(54) SECURITY WITH AUTHENTICATION PROXY

(75) Inventors: Atle Ræstad, Aremark (NO); Knut Snorre Bach Korneliussen, Oslo (NO); Dagfinn Aarvaag, Oslo (NO); Espen Iveland, Drammen (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 489 days.

(21) Appl. No.: 09/655,871

(22) Filed: Sep. 6, 2000

(30) Foreign Application Priority Data

Sep. 6, 1999 (NO) ................................ 19994334

(51) Int. Cl.
*G06F 17/00* (2006.01)
(52) U.S. Cl. ............................. 726/14; 726/12; 726/11
(58) Field of Classification Search ................ 713/200, 713/201; 709/225; 726/3–6, 14, 12, 11
See application file for complete search history.

(56) References Cited

U.S. PATENT DOCUMENTS

| 5,586,260 | A |   | 12/1996 | Hu |   |
| 5,913,025 | A |   | 6/1999 | Higley et al. |   |
| 5,999,525 | A | * | 12/1999 | Krishnaswamy et al. | ... 370/352 |
| 6,259,691 | B1 | * | 7/2001 | Naudus | ....................... 370/352 |

FOREIGN PATENT DOCUMENTS

EP      0 503 765 A2    9/1992

OTHER PUBLICATIONS

An analytical comparison of cooperation protocols for Web proxy servers; Quaglia, F.; Ciciani, B.; Colajanni, M.; Modeling, Analysis and Simulation of Computer and Telecommunication Systems, 1999. Proceedings. 7th International Symposium on Oct. 24-28, 1999 pp. 174-181.*
Performance analysis of reliable multicast protocol using transparent proxy servers over hybrid networks Sung-Kwan Youm; Meejoung Kim; Chul-Hee Kang; Performance, Computing, and Communications Conference, 2005. IPCCC 2005. 24th IEEE International Apr. 7-9, 2005 pp. 257-264.*
Cooperative proxy scheme for large-scale VoD systems Chen-Lung Chan; Te-Chou Su; Shih-Yu Huang; Jia-Shung Wang; Parallel and Distributed Systems, 2002. Proceedings. Ninth International Conference on Dec. 17-20, 2002 pp. 404-409.*
International Search Report mailed Dec. 12, 2000 in corresponding PCT application No. PCT/NO00/00287.
International Preliminary Examination Report mailed Nov. 11, 2001 in corresponding PCT Application No. PCT/NO00/00287.
"Visual Telephone Systems and Equipment for Local Area Networks Which Provide a Non-Guaranteed Quality of Service", International Telecommunication Union, ITU-T Recommendation H.323.

* cited by examiner

*Primary Examiner*—David Jung
(74) *Attorney, Agent, or Firm*—Nixon & Vanderhye, P.C.

(57) ABSTRACT

An arrangement to accomplish authentication of end-users (1) and end-points (1) in a packet based network, which includes components that support all or parts of different versions of the H.323 recommended standard, be proposed. Authentication is accomplished by means of an authentication proxy (2), which will support security profiles supported by one or more associated gatekeepers (3). Provision of end-user (1) and end-point information for an authentication proxy (2) may be accomplished by means of standard non-proprietary communication and protocol such as http or https and a simple html form, an applet or a servlet respectively, and for a gatekeeper (3) by means of a RAS message such as gatekeeper request (GRQ).

16 Claims, 8 Drawing Sheets

SECURITY WITH AUTHENTICATION PROXY

FIELD OF INVENTION

The present invention relates to the field of audio, video and data communications across packet based networks, particularly to authentication of end-users and end-points in networks complying with the H.323 specification of the International Telecommunications Union.

RELATED ART AND OTHER CONSIDERATIONS

The ITU-T recommendation H.235 of the International Telecommunications Union recommends a standard for security and encryption for multimedia terminals complying with the H-Series recommendations (H.323 and other H.235-based) of International Telecommunications Union. H.235 is a new feature in version 2 (H.323v2) of the H.323 recommendation. It adds various security mechanisms like authentication and integrity checks to the recommended standard H.323. In version 1 (H.323v1) of the H.323 there were no security mechanisms, and the network had to trust that the end-users were who they claimed to be. This constitutes a problem when end-users have their own confidential profiles in the system including a set of supplementary services. End-user authentication is also a prerequisite when billing the end-user for the H.323 traffic, and when building virtual private networks on the H.323 network.

Even though the use of H.235 looks promising, some major problems remain to be solved. One problem is that there is a wide use of H.323 version 1 end-points in use. As stated above, only end-points complying with H.323v2 can support H.235. Another problem is that very few of the end-points complying with H.323v2 that are on the marked today support H.235. Both of these problems need to be solved in an H.323 network which base its logic on authenticated end-users.

Another problem area is H.235 itself, since it is very generic and needs a security profile to be applied. In a network it is likely that many different security profiles will be in use by different end-points. When security profiles are different, conversion of one security profile to another security profile cannot be made since the security profiles generally will perform different hash function on different data. As a consequence it is not practical for the H.323 network components to support all security profiles.

An example to illustrate the problem with two clients with different security profiles is shown in FIG. 1. In this example the gatekeeper (3) needs to support both security profiles to be able to authenticate both end-users (1) using the two H.323 clients.

One solution to the problems with H.235 is to not base the authentication on H.235 at all, and use a proprietary protocol for end-user (1) authentication. This in turn leads to two problems:

1) The end-user (1) has to start two programs, the authentication client, and the H.323 client when using the H.323 network even though the H.323 client is a version 2 client with H.235 support.

2) The H.323 network has to support a new proprietary protocol in addition to H.323.

Another known solution is to apply the IMTC Security Profile 1 (SP1) proposed by the International Multimedia Teleconferencing Consortium. It is however focused on message by message authentication and integrity, and has not made a clear distinction between user authentication and message integrity.

Accordingly, it is an object of the present invention to provide an arrangement in a H.323 network that will allow authentication of end-points that comply with H.323v1.

Another object of the present invention is to provide an arrangement in a H.323 network, which will allow authentication of end-points that comply with H.323v2 but do not support H.235.

A further object of the present invention is to provide an arrangement in a H.323 network, which will allow authentication of end-users (1) clients with different security profiles.

BRIEF SUMMARY

The above objects are met in an arrangement provided by the present invention, wherein an authentication proxy is provided and a gatekeeper supports a security profile used by an authentication proxy.

BRIEF DESCRIPTION

In the following, by way of example the present invention will be described in more detail.

Figure 7:
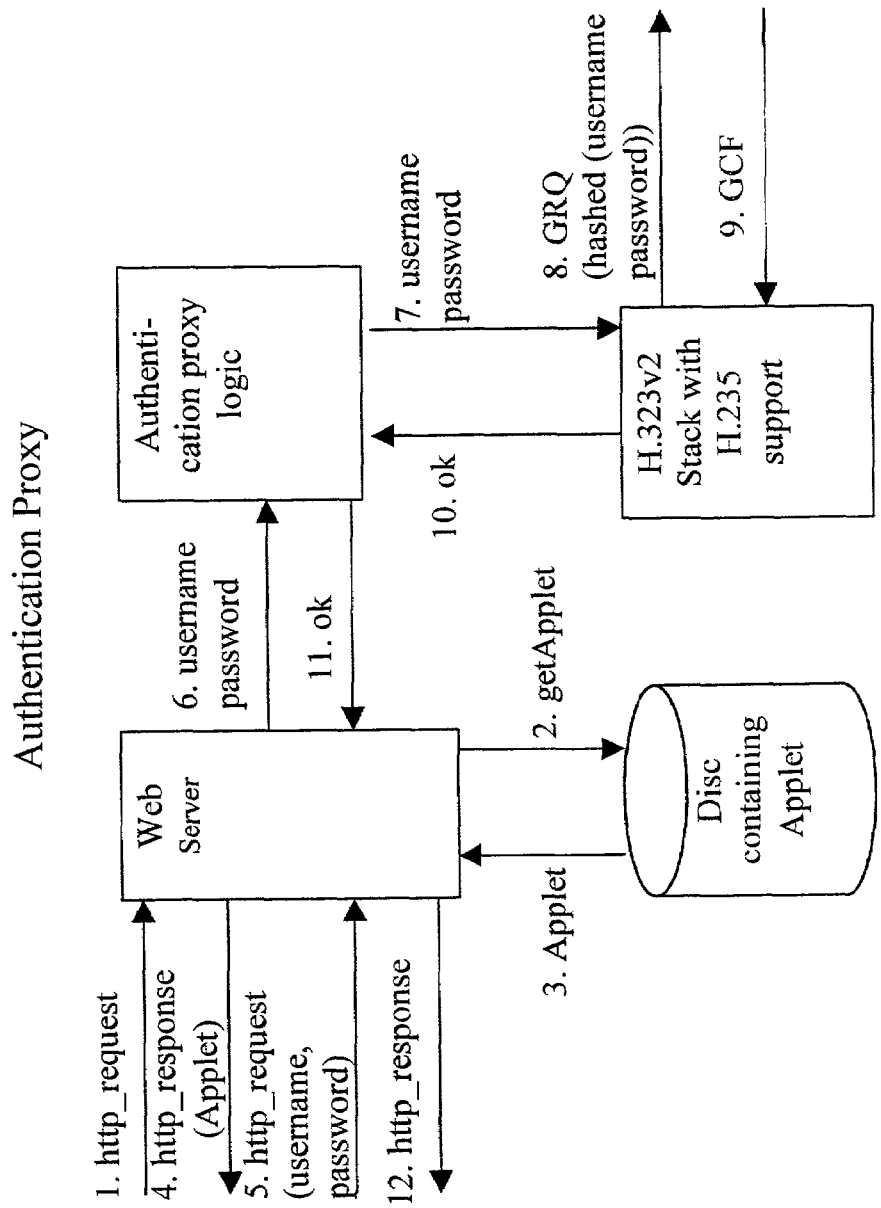
FIG. 7 shows a block diagram for the authentication proxy with a numbered signalling flow for a simple authentication scheme (no challenge/response). If a challenge/response scheme is used, then the signalling flow must be extended between point 9 and 10 according to FIG. 5.

Referring to FIG. 7, an example of an embodiment of the present invention is shown. All information the authentication proxy needs, will be requested from the end-user (1) through standard http communication or any other suitable protocol.

In the following, only for the purpose of explaining the present invention the protocol used will be http.

The end-user (1) could be presented a simple html form, an applet (that can be signed), a servlet or likewise for providing his/her user name and password. This is shown in step 1 and 2 in FIG. 7. If an applet is used it should be signed, so that the end-user can be sure of the origin of the applet. The applet must be signed if it is received from another entity than the authentication proxy. The reason is that most environments that execute applets do not allow applets to communicate with other entities than their origin unless they are signed.

Figure 1:
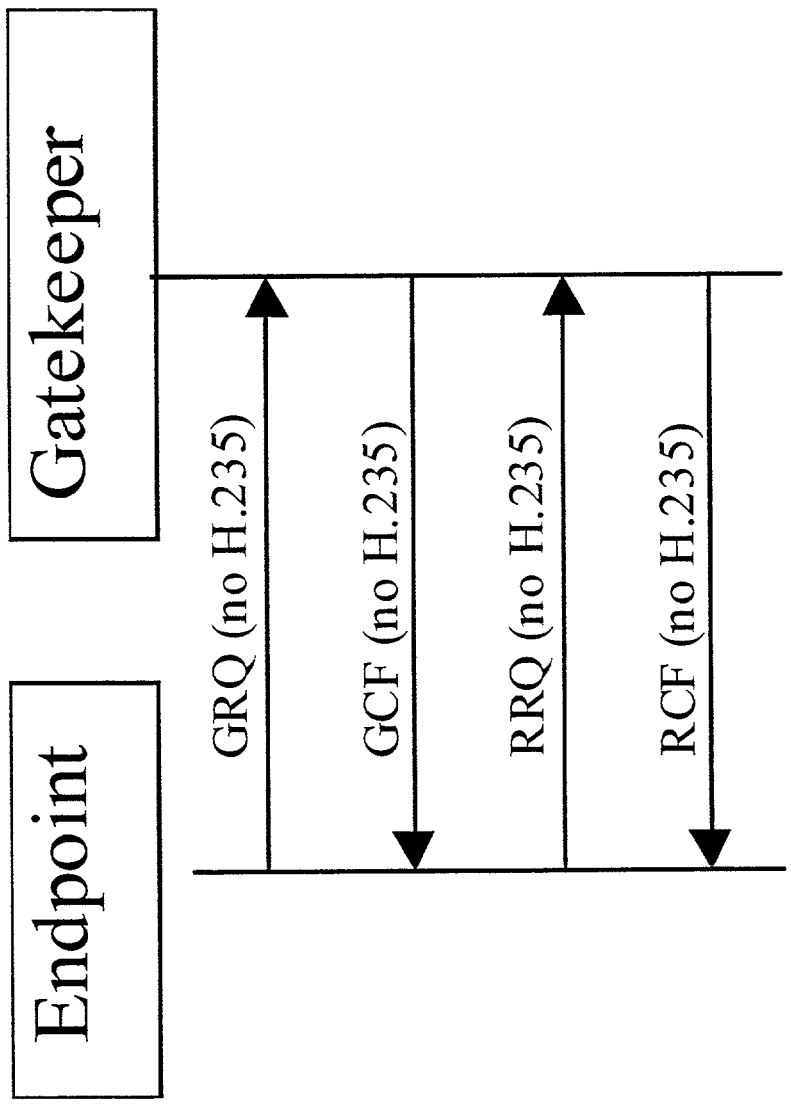
FIG. 1 shows how the registration procedure is performed according to prior art when two end-points that support either H.323v1 or H.323v2 without support for H.235 performs a registration towards a gatekeeper. In this scenario the Gatekeeper has to trust the end-points to be who they claim to be since no authentication actions are supported.
Figure 2:
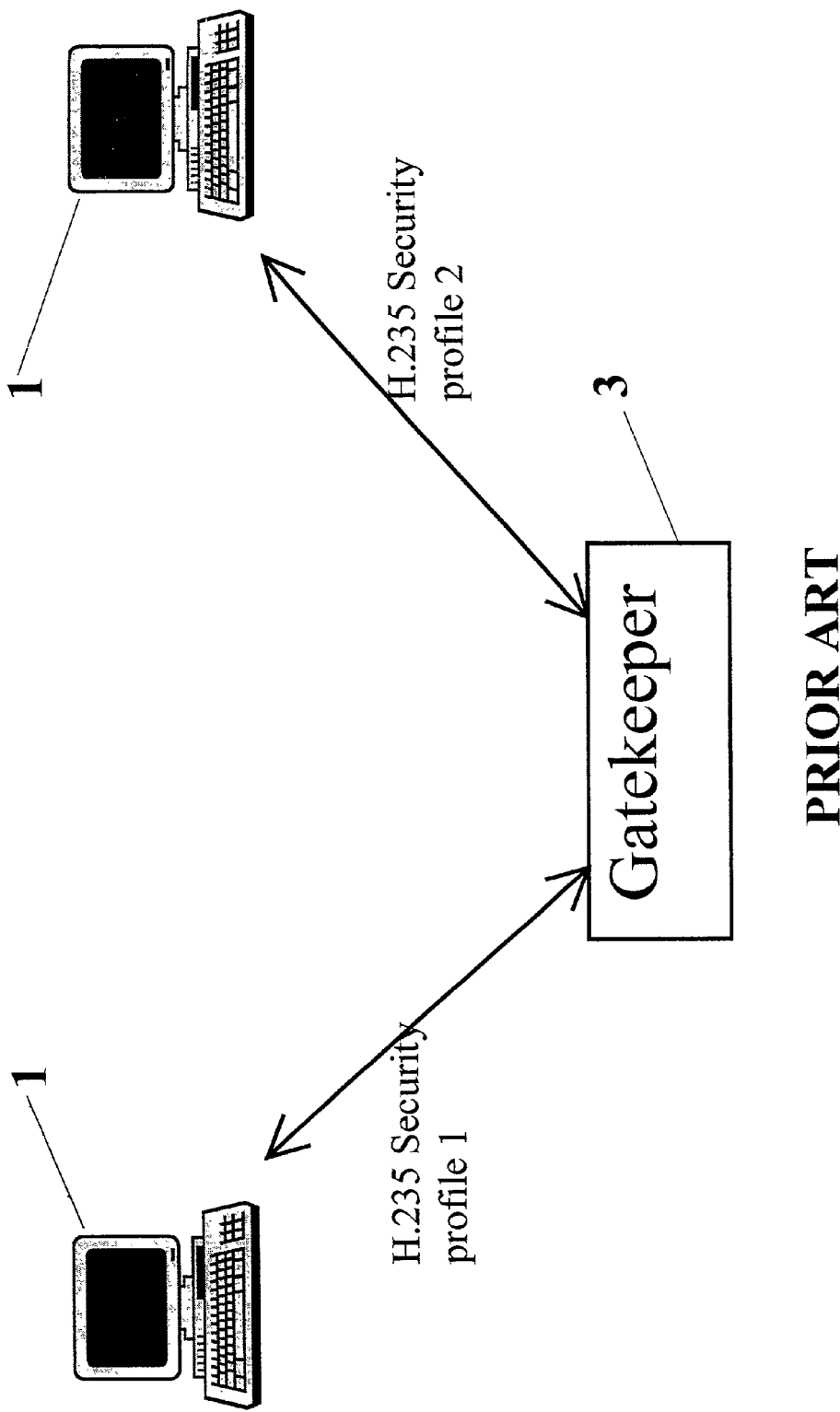
FIG. 2 shows an example of a prior art arrangement in which the gatekeeper (3) encounters different clients with different security profiles. The registration is following the same procedural flow as shown in FIG. 1 (but now with H.235). In this arrangement the gatekeeper has to support all the different profiles used by the registering end-points. This constitutes a problem because the gatekeeper is a traffical node, and supporting several different profiles will slow down its normal operations.
Figure 3:
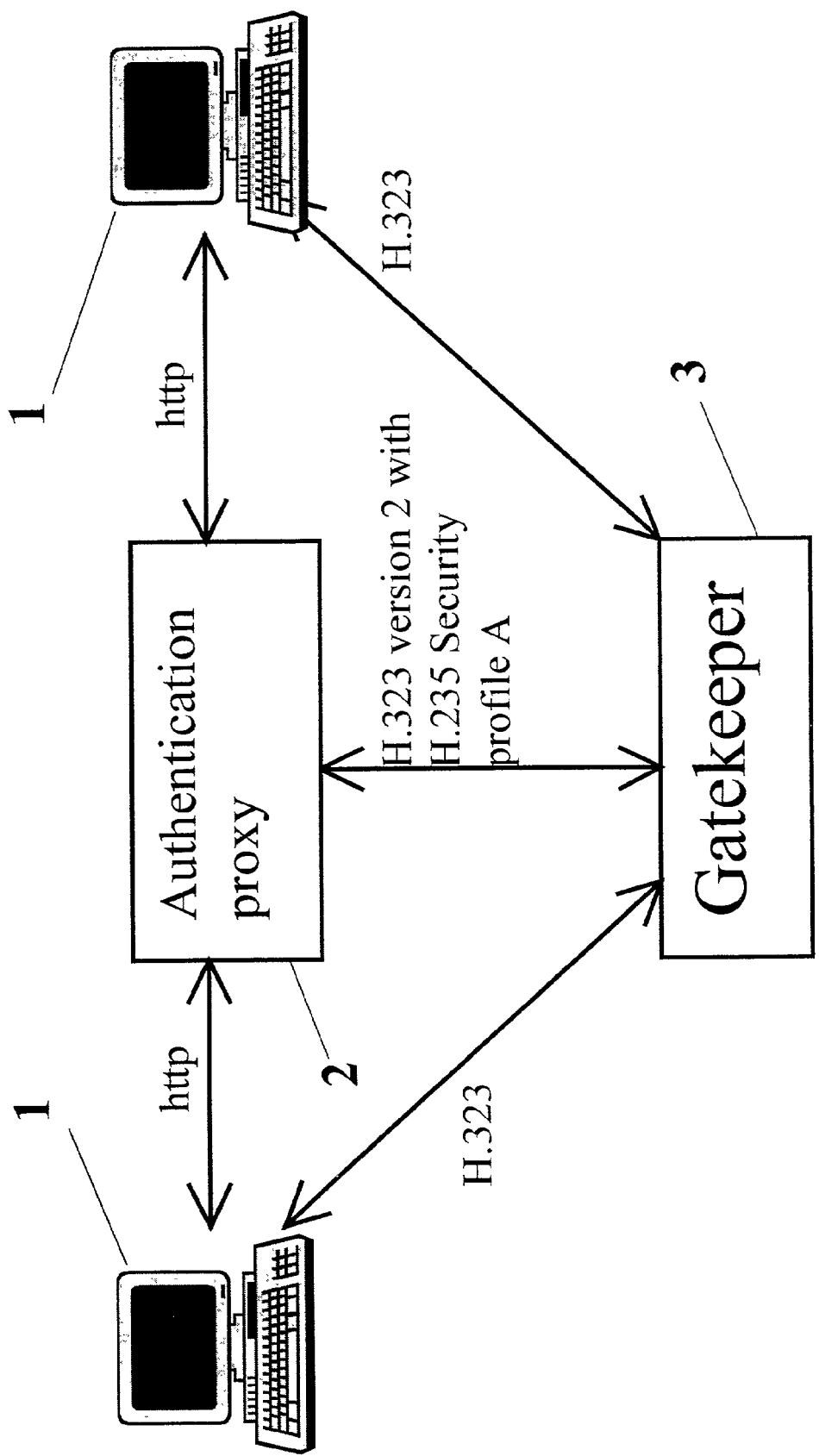
FIG. 3 shows an example of signal flow of an arrangement according to the invention.
Figure 4:
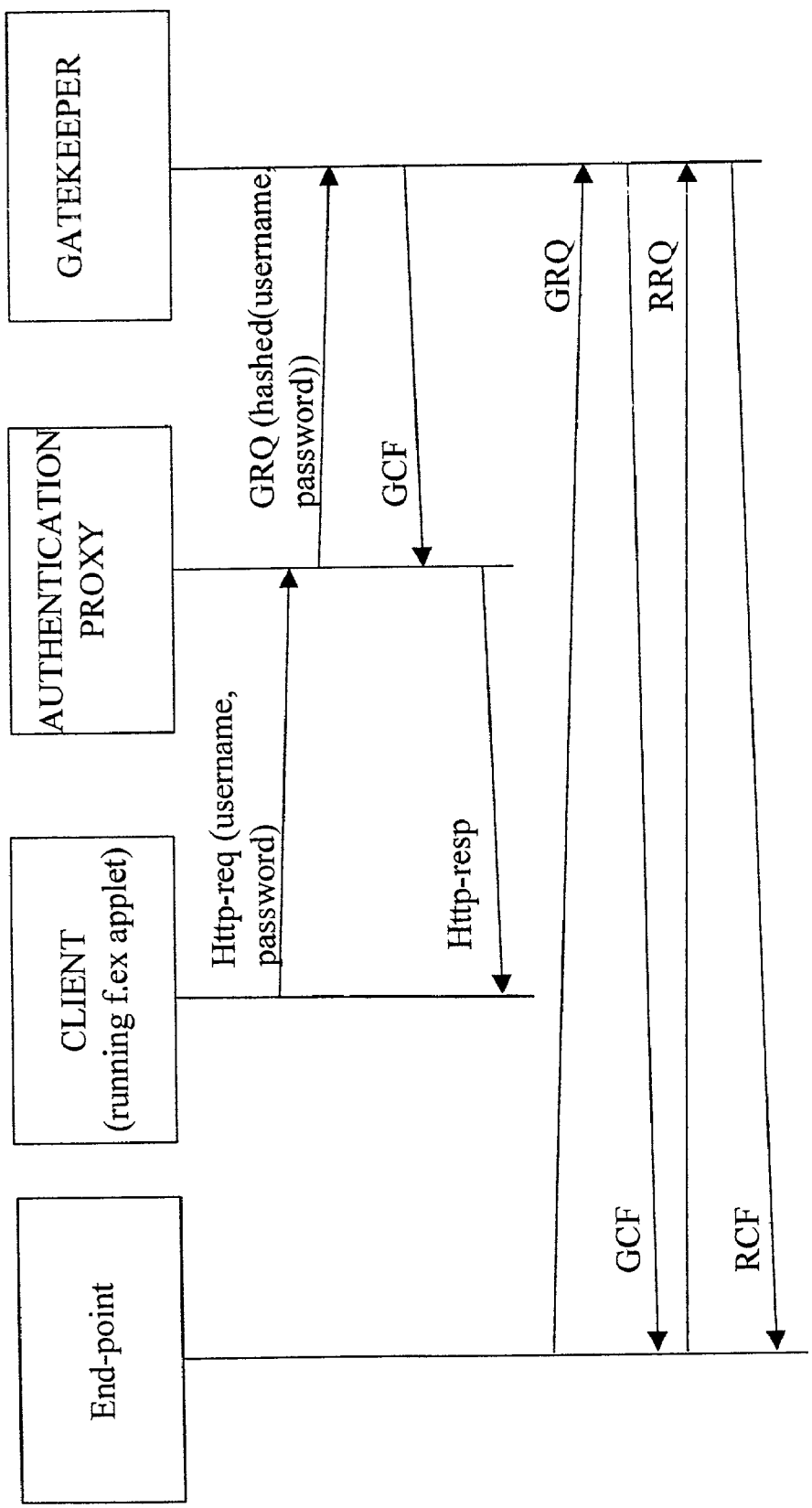
FIG. 4 shows an example of a sequence of signal flow of an arrangement according to the invention including the messages sent between the different entities. In this sequence, a one stage authentication scheme is shown.
Figure 5:
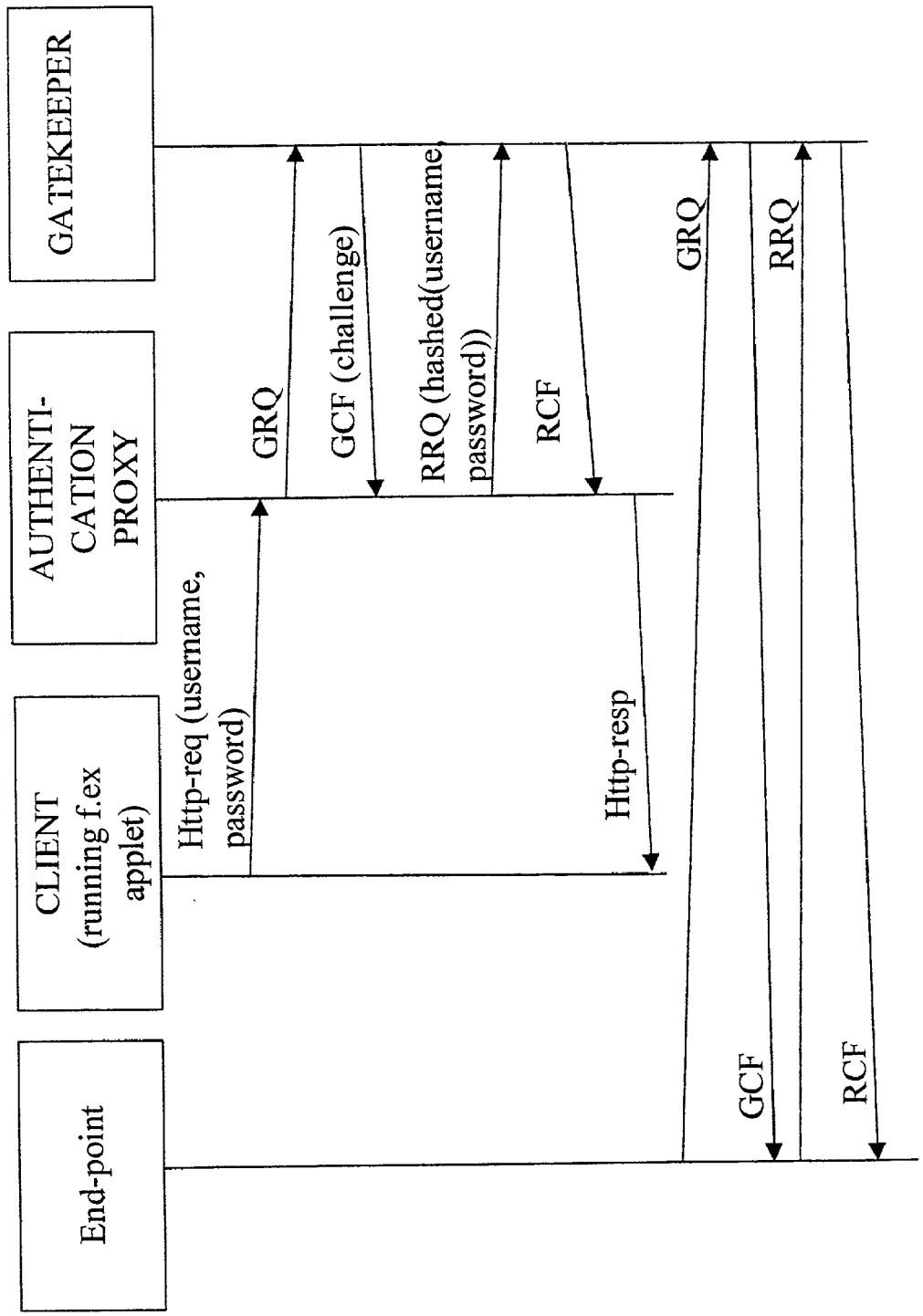
FIG. 5 shows an example of a sequence of signal flow of an arrangement according to the invention including the messages sent between the different entities. In this sequence, a two-stage authentication scheme is shown; this is called challenge/response scheme.
Figure 6:
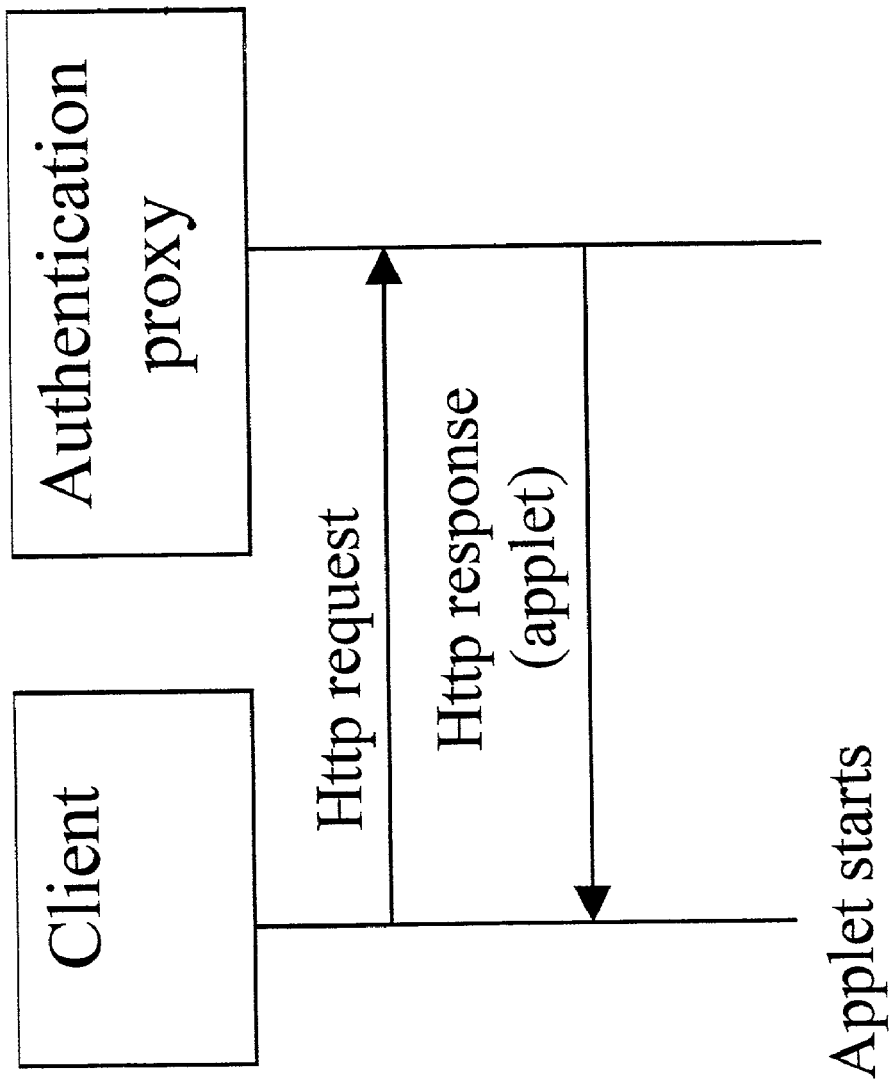
FIG. 6 shows how an applet can be received from the authentication proxy. It is not necessary that the applet is received from the authentication proxy; it can be received from any other entity as long as it sends the http-request with username and password to the authentication proxy. Because the security aspects on the client becomes simpler (it is not an absolute requirement that the applet is signed) when the applet is received from the authentication proxy, this scenario will be used hereinafter.

The hashing described in the H.235 security profile should be done by the applet if an applet is used. If the hashing is not performed by the applet (e.g. according to FIG. 7.), or something else than an applet is used, the communication protocol should instead be SSL, i.e. https instead of http. The reason for adding a secure socket layer for http is that this will avoid the username and password to travel unsecured across the network. The hashing will then be performed in the authentication proxy, and the username and password will be secured all the way to the gatekeeper. In scenarios when end-point supports H.235 but with different security profiles (see FIG. 2) the authentication proxy can be used for converting between different security profiles (as shown in FIG. 3). This is beneficial because it keeps the complexity of understanding different security profiles away from the gatekeeper.

Referring to FIG. 7, signal flow is explained in the following by way of example. When the authentication proxy (2) receives the information from the user over http, https or other standard protocols, it generates a standard RAS message such as a H.323v2 GRQ (gatekeeper Request), which holds the H.235 data. This is sent directly to a gatekeeper (3) according to H.323v2, where the actual authentication is done. The gatekeeper then checks the username and password, and sends back a GCF. A GRJ is sent back if the username and password does not match. When the authentication proxy receives the GCF, it will send an http-response to the client (step 12). If the authentication proxy receives a GRJ it will inform the end-point of the unsuccessful authentication attempt in the http-response. If challenge/response authentication is used, the authentication proxy will wait for an RRQ and a retrieval of an RCF before it sends the http response back to the user (see FIG. 7).

The H.323 client can now register with the gatekeeper (3) in a normal way by sending GRQ and RRQ. The gatekeeper (3) will know when it receives the GRQ and RRQ that the user/end-point (1) already is authenticated based on the user name, the Internet Protocol (IP)-address or both.

Figure 8:
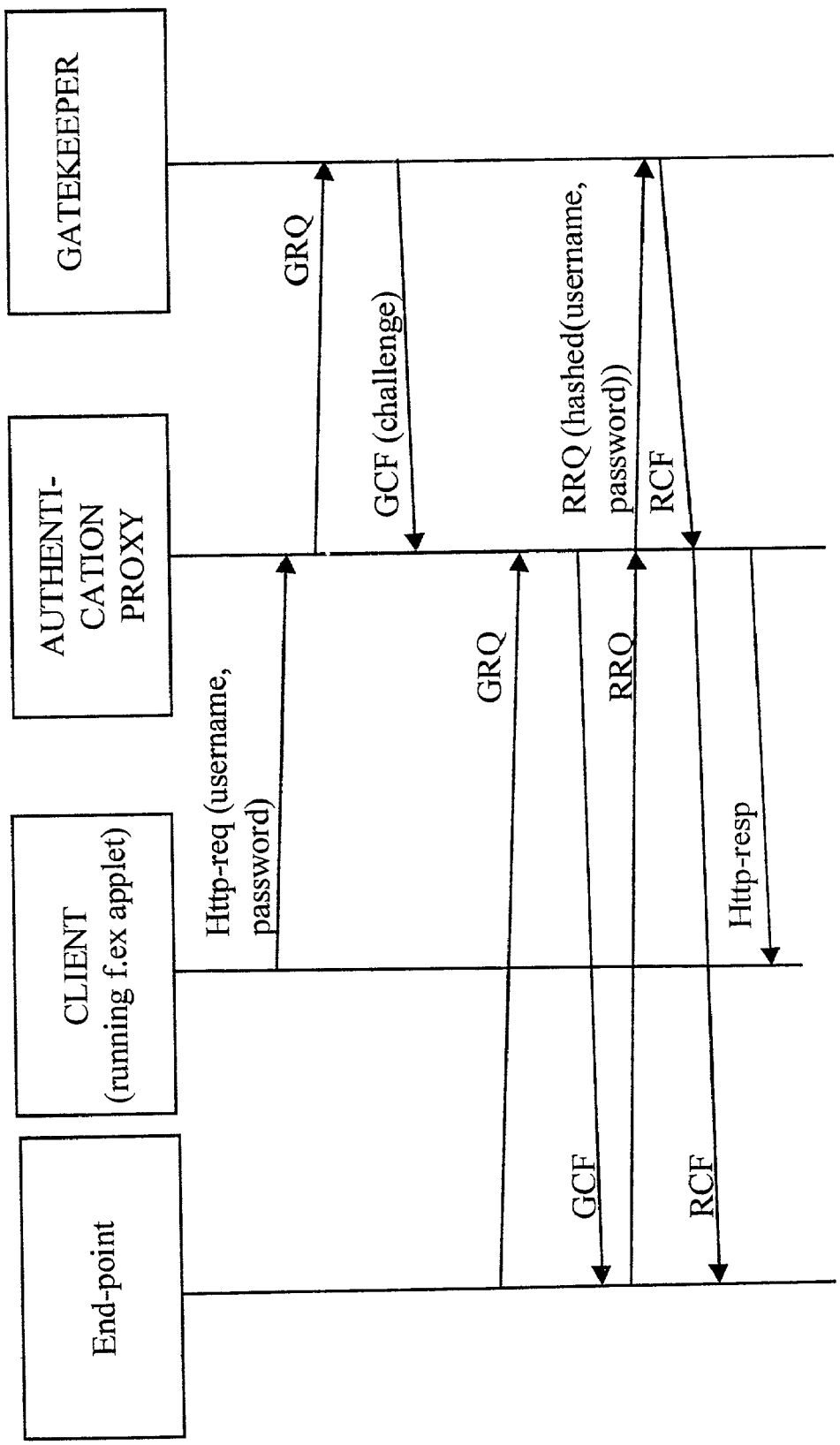
FIG. 8 shows a schematic representation of an embodiment example of a sequence of signal flow in an arrangement according to the invention.

To avoid problems in the gatekeeper (3) when receiving two GRQ's (one from the proxy (2) and one from the end-point (1)), the authentication proxy can answer GRQ's sent from end-points (1) complying with H.323v1 and end-points (1) complying with H.323v2 without H.235 support directly (This is not shown in FIG. 8). Because the gatekeeper (3) will only receive H.323v2 GRQ's when this feature is added, the gatekeeper (3) can not, based on the GRQ, decide which version of the H.323 the various end-points (1) are complying with. The Gatekeeper (3) should instead base it decision on the received RRQs or other suitable RAS messages from endpoints. If this scenario is used together with challenge/response authentication. The RRQ must also be sent to the authentication proxy (see FIG. 7). Because of the nature of H.323, this scenario implies that all further RAS signalling has to go through the authentication proxy.

The authentication proxy can be placed anywhere in the network. In some networks where a firewall is present between the client and the gatekeeper, it can be wise to place the authentication proxy in De-Militarised Zone (DMZ). This misses because it is sometimes difficult to let an SSL stream pass through a firewall.

The invention claimed is:

1. An authentication proxy arrangement in a H.323 telecommunication network for allowing authentication of an end-user operating from an H.323 end-point without H.323v2 or H.235 authentication support and with a Gatekeeper requiring initial end-user authentication according to a first authentication protocol using H.235 and thus being unsupported by the end-point, the first authentication protocol being at least part of H.323v2 or a corresponding first security profile, said authentication proxy being adapted to form a signaling path for authentication of the end-point towards the Gatekeeper, the authentication proxy being arranged:

to receive from the end-point of the end-user, authentication data comprising an end-user password and an end-point network location specification, the authentication data being transmitted to the authentication proxy using a second protocol different from said first protocol, to generate a first H.323 RAS (Registration, Admission and Signaling) message using said first protocol, said first H.323 RAS message presenting said obtained authentication data and including an authentication request requesting authentication of the end-user by the Gatekeeper on basis of said presented authentication data, to transmit said first H.323 RAS message to the Gatekeeper, to receive a second H.323 RAS message from the Gatekeeper in response to said first H.323 RAS message, to interpret said second H.323 RAS message from the Gatekeeper for detecting a confirmation or rejection of said authentication request, and to generate and send to said end-point, on detection of said confirmation or rejection of said authentication request, an authentication confirm or reject message, respectively, using the second protocol.

2. The arrangement of claim 1, wherein the end-point network location specification is an internet protocol (IP) address or a user name.

3. The arrangement of claim 1, wherein obtaining the authentication data is performed by a simple html form, an applet, or a servlet.

4. The arrangement of claim 3, wherein the applet is a signed applet.

5. The arrangement of claim 1, wherein the second protocol includes http or https.

6. The arrangement of claim 1, wherein said first H.323 RAS message is a H.323.V2 GRQ (Gatekeeper request) or a RRQ (Registration request), respectively including H.235 data that includes said authentication data.

7. The arrangement of claim 6, wherein the second H.323 message is a GCF (Gatekeeper confirm) or a RCF (Registration confirm).

8. The arrangement of claim 1, wherein the authentication proxy is arranged to sending to the end-point of the end-user an http-response indicating authentication failure if the second H.323 message is a GRJ (Gatekeeper reject).

9. A method using an authentication proxy arrangement in a H.323 telecommunication network for allowing authentication of an end-user operating from an H.323 end-point (1) without H.323v2 or H.235 authentication support and intending to operate with a Gatekeeper requiring initial end-user authentication according to a first authentication protocol using H.235 and thus being unsupported by the end-point, the first authentication protocol being at least part of H.323v2 or a corresponding first security profile, said authentication proxy being adapted to form a signaling path for authentication of the end-point towards the Gatekeeper, said method including:

receiving from the end-point of the end-user, authentication data comprising an end-user password and an end-point network location specification, the authentication data having been transmitted to the authentication proxy using a second protocol different from said first protocol, generating a first H.323 RAS message using said first protocol, said first H.323 RAS message presenting said obtained authentication data and including an authentication request requesting authentication of the end-user by the Gatekeeper on basis of said presented authentication data, transmitting said first H.323 RAS message to the Gatekeeper, receiving a second H.323 RAS message from the Gatekeeper in response to said first H.323 RAS message, interpreting said second H.323 RAS message from the Gatekeeper for detecting a confirmation or rejection of said authentication request, and generating and sending to said end-point, on detection of said confirmation or rejection of said authentication request, an authentication confirm or reject message, respectively, using the second protocol.

10. The method of claim 9, wherein the end-point network location specification is an internet protocol (IP) address or a user name.

11. The method of claim 9, wherein obtaining the authentication data is performed by a simple html form, an applet, or a servlet.

12. The method of claim 11, wherein the applet is a signed applet.

13. The method of claim 9, wherein the second protocol includes http or https.

14. The method of claim 9, wherein the first H.323 RAS message is a H.323.V2 GRQ (Gatekeeper request) or a H.323.V2 RRQ (Registration request), respectively, including H.235 data that includes said authentication data.

15. The method of claim 9, wherein the second H.323 message is a GCF (Gatekeeper confirm) or a RCF (Registration confirm).

16. The method of claim 9, including the step of sending to the end-point of the end-user an http-response indicating authentication failure if the second H.323 message is a GRJ (Gatekeeper reject).

* * * * *